(12) United States Patent
Boehnke (10) Patent No.: US 8,201,331 B2
(45) Date of Patent: Jun. 19, 2012

(54) CATALYTIC CONVERTER AND METHOD OF MAKING THE SAME

(75) Inventor: John C. Boehnke, Grand Blanc, MI (US)

(73) Assignee: Katcon Global S.A. DE C.V., Bascharage (LU)

( * ) Notice: Subject to any disclaimer, the term of this patent is extended or adjusted under 35 U.S.C. 154(b) by 929 days.

(21) Appl. No.: 12/245,200

(22) Filed: Oct. 3, 2008

(65) Prior Publication Data

US 2010/0083484 A1  Apr. 8, 2010

(51) Int. Cl.
*B01D 50/00* (2006.01)
*B21D 39/00* (2006.01)

(52) U.S. Cl. .................. 29/890; 29/515; 29/520; 29/521

(58) Field of Classification Search .................. 29/515, 29/520, 521, 890; 422/179, 180
See application file for complete search history.

(56) References Cited

U.S. PATENT DOCUMENTS

| | | | | |
|---|---|---|---|---|
| 4,546,297 A | * | 10/1985 | Washbourn et al. | 318/372 |
| 6,389,693 B1 | * | 5/2002 | Aranda et al. | 29/890 |
| 6,532,659 B1 | * | 3/2003 | DeSousa et al. | 29/890 |
| 6,769,281 B2 | * | 8/2004 | Irie et al. | 72/121 |
| 7,179,431 B2 | * | 2/2007 | Lesher et al. | 422/180 |
| 2004/0031149 A1 | * | 2/2004 | Irie et al. | 29/890 |
| 2005/0138786 A1 | * | 6/2005 | Irie et al. | 29/446 |
| 2007/0180695 A1 | * | 8/2007 | Sugiyama | 29/890 |
| 2007/0271786 A1 | | 11/2007 | Hardesty et al. | |
| 2008/0028608 A1 | | 2/2008 | Labarge et al. | |

* cited by examiner

*Primary Examiner* — Alexander P Taousakis (74) *Attorney, Agent, or Firm* — Butzel Long (57) ABSTRACT

A method of making a catalytic converter includes providing a catalyst substrate having a substrate periphery and a mat support disposed thereon. The method also includes providing a metal shell having a shell wall having a shell periphery and a bore that is configured to receive the catalyst substrate and mat support. It further includes inserting the catalyst substrate and mat support into the bore of the metal shell in slidable engagement therewith. Still further it includes reducing the shell periphery while applying an axial force sufficient to cause translation of the catalyst substrate and mat support relative to the bore until the force reaches a predetermined retention force threshold, whereupon the reducing of the shell periphery and translation of the catalyst substrate is stopped.

20 Claims, 4 Drawing Sheets

CATALYTIC CONVERTER AND METHOD OF MAKING THE SAME

TECHNICAL FIELD

This invention relates generally to catalytic converters and methods of manufacturing the same and, more particularly, to catalytic converters having a controlled retention of the catalyst substrate and methods of manufacturing the same.

BACKGROUND OF THE INVENTION

Catalytic converters have been employed for many years to catalyze exhaust fluids in vehicles and have been manufactured in a number of ways. Catalytic converters ensure that the residual fuel in fuel-rich exhaust fluids are reduced down to acceptable levels. They are a comparatively expensive, and their manufacture is labor intensive. Accordingly, methods of manufacture have been put forth in attempts to reduce manufacturing costs, while at the same time, increasing durability and stabilizing system performance.

One method of manufacturing catalytic converters is to provide a pre-made, pre-sized metal canister and insert the catalyst substrate and the insulation/support pad. In this method, the catalyst substrate is wrapped with a thermally insulating blanket or mat of an intumescent or non-intumescent material of predetermined thickness and weight (various weights may be employed for various applications and desired properties). The wrapped substrate assembly has an outer dimension about 8 mm larger than the inside dimension of the converter shell or canister. The wrapped substrate assembly is forced through a reduction cone and into the converter shell. Up to about 20,000 lbs of force may be used to accomplish the insertion of the assembly into the can. More particularly, within this range a force up to 7,000 lbs may be used.

A catalytic converter may also be produced by a method referred to as "the tourniquet method." The tourniquet method dispenses with the reducing cone and thus avoids the high insertion pressures on the catalyst substrate and mat materials. The method places the substrate and mat assembly into a canister open on one longitudinal edge. The canister is closed around the assembly by straps and compressed to the desired size. The open ends of the canister will, in this position, be overlapping and then are welded together. This method is also expensive and labor intensive. Further, due to this overlap, engineering design consideration must be given to the space alteration inside the canister due to the overlapped edge. The overlapped edge causes a localized mat density change in the area of the overlap.

Yet another method of making a catalytic converter may be described as a size-to-fit method. The mat support weight and substrate size (e.g., diameter) are measured to determine a size that will achieve the desired amount of compression of the mat thickness. The canister is then formed to increase or decrease the size (e.g., diameter). The mat is then wrapped around the substrate and inserted into the formed canister. The method seeks to indirectly provide a predetermined compressive force sufficient to prevent shifting or movement of the substrate and mat along the longitudinal axis of the canister.

Still another method of making a catalytic converter may be described as a size-to-force method. The mat support is wrapped around the substrate and inserted into a gauging fixture. The gauging fixture determines the size requirements needed to obtain a predetermined compressive force. The canister is then formed to increase or decrease the size (e.g., diameter). The wrapped substrate is then inserted into the formed canister. The method seeks to indirectly provide a predetermined compressive force sufficient to prevent shifting or movement of the substrate and mat along the longitudinal axis of the canister.

The methods described above seek to securely retain a catalyst substrate in a metal shell by means of a compressible mat support while also providing thermal isolation and insulation between the catalyst substrate and the metal shell used to house it. Despite the number of methods employed to make catalytic converters, achieving the objectives described has been problematic. Proper retention of the substrate requires that it be prevented from shifting along with the longitudinal axis of the metal shell and catalyst substrate. This requires repeatable friction coefficient, density and other characteristics of the mat support in relation to both the catalyst substrate and metal shell. Since each of these components may have substantial variability both compositionally, due to the use of different combinations of the catalyst substrate, mat support and metal shell materials used to achieve different performance characteristics, and due to lot-to-lot variations associated with manufacturing variability of these materials, accurate characterization of all of the factors needed to insure repeatability would require extensive testing and characterization of the constituent materials and quality control programs to assure conformity once the various material combinations have been characterized. Thus, achieving such repeatable retention of the catalyst substrate in catalytic converters having various combinations of the components described has been elusive.

For example, the various mat support materials employed frequently have various additives applied to the base and mat material to provide the necessary thermal insulation and other performance characteristics required. Such variations affect the compressibility of the mat material, as well as its friction coefficient with regard to both the metal shell and catalyst substrate. In addition to variability in the physical properties of the mat support material, the metal shell also may be made from many different materials, such as various grades of stainless steel, each having localized variations in surface finish, inner diameter and other aspects along the length of the tubular and other materials used to form the shell that can affect retention of the catalyst substrate. Still further, the catalyst substrate can be made from many different ceramic and composite materials, each having different surface morphologies (e.g., localized variations in surface roughness and outer diameter), and may have many different catalyst materials added to their outer surfaces that may also affect the surface morphology and friction coefficient with regard to the mat support. Variations in these properties directly affect the retention characteristics of the catalyst substrate, since the mat support acts as a spring member to apply a retention force to the catalyst substrate by action against the interior surface of the metal shell, and it's friction coefficient with respect to these components determines the amount of the compressive force needed to secure the catalyst substrate and prevent its movement along the longitudinal axis of the metal shell.

The manufacturing methods employed previously indirectly assess sizing of the components needed to achieve the retention of the catalyst substrate utilize assumptions as to the friction coefficient between the mat support and both the metal shell and catalyst substrate, including factors that affect the coefficient of friction such as the surface morphology of the catalyst substrate and any variation materials or surface finish. They generally focus on development of a predetermined density of the compressed matt support in the gap between the inner surface of the metal shell and the outer surface of the catalyst substrate, or the gap bulk density in order to achieve retention of the catalyst substrate in the metal shell. They are known to have undesirable amounts of variability. This variability can result in undesirable failure rates of catalytic converters made using these methods in conjunction with the use of automotive vehicles in which they are installed. If the compressive force is too low, or the friction coefficient assumptions are inaccurate, or some combination of these conditions, the catalyst substrate may shift in the metal shell leading to failure. If the compressive force is too high, the thermal protection may be degraded or excessive forces may be applied to the catalyst substrate, either one of which may also lead to failure of the catalyst substrate and consequent failure of the catalytic converter.

Therefore, it is desirable to reduce variability of the retention of the catalyst substrate within the metal shell, thereby improving performance of the catalytic converters in which they are employed.

SUMMARY OF THE INVENTION

In general terms, this invention provides a method of making a catalytic converter that is based on assembly of the catalytic converter components to directly achieve a predetermined retention force threshold for holding the catalyst substrate in place, in contrast to methods which use assumptions about the catalytic converter components and/or the gap bulk density to provide retention of the catalyst substrate.

In one aspect, a method of making a catalytic converter includes providing a catalyst substrate having a substrate periphery and a mat support disposed thereon. The method also includes providing a metal shell having a shell wall having a shell periphery and a bore that is configured to receive the catalyst substrate and mat support. It further includes inserting the catalyst substrate and mat support into the bore of the metal shell in slidable engagement therewith. Still further it includes reducing the shell periphery while applying an axial force sufficient to cause translation of the catalyst substrate and mat support relative to the bore until the force reaches a predetermined retention force threshold, whereupon the reducing of the shell periphery and translation of the catalyst substrate is stopped.

In another aspect, a method a making a catalytic converter includes providing a catalyst substrate having a substrate periphery and a mat support disposed thereon. It also includes providing a metal shell having a shell wall having a shell periphery and a bore that is configured to receive the catalyst substrate and mat support. It further includes inserting the catalyst substrate and mat support into the bore of the metal shell in slidable engagement therewith. Still further, it includes reducing the shell periphery while applying an axial force sufficient to cause translation of the catalyst substrate and mat support relative to the bore. Yet further, it includes limiting the axial force applied during translation of the catalyst substrate and mat support to a predetermined retention force threshold, whereupon the reducing of the shell periphery and translation of the catalyst substrate is stopped.

In yet another aspect, a catalytic converter includes a metal shell having an inner surface, a central bore and a peripheral size. It also includes a catalyst substrate having an external surface. The catalyst substrate is disposed within the central bore. Still further, it includes a compressible mat support disposed between the inner surface of the metal shell in the outer surface of the catalyst substrate, and the mat support has a first friction coefficient relative to the metal shell, a second friction coefficient relative to the catalyst substrate, and the mat support provides a spring force acting to retain the catalyst substrate within the bore. The peripheral size is configured as a function of the spring force, first friction coefficient and second friction coefficient to provide a predetermined axial retention force.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

A catalytic converter for a mobile vehicle can catalytically treat exhaust gas streams using a catalyst disposed on at least one catalyst substrate. The catalyst substrate can comprise any material designed for use in a spark ignition or diesel engine environment and having the following characteristics: (1) capable of operating at temperatures up to about 1,000° C.; (2) capable of withstanding exposure to hydrocarbons, nitrogen oxides, carbon monoxide, carbon dioxide, and/or sulfur; and (3) having sufficient surface area and structural integrity to support the desired catalyst. Some possible materials include cordierite, silicon carbide, metallic foils, alumina sponges, porous glasses, and the like, and mixtures comprising at least one of the foregoing, with cordierite and mixtures comprising cordierite preferred. Some ceramic materials include "HONEY CERAM", commercially available from NGK-Locke, Inc, Southfield, Mich., and "CELCOR", commercially available from Corning, Inc., Corning, N.Y.

Zirconia may also be added to the catalyst substrate material to increase the structural integrity of the thin walled, high cell density catalyst substrates.

Although the catalyst substrate can have any size or geometry, the size and geometry are preferably chosen to optimize the surface area in the given catalytic converter design parameters. Typically, the catalyst substrate has a honeycomb cell geometry, with the cells being any multi-sided or rounded shape, with substantially square, hexagonal, octagonal or similar geometries preferred due to ease of manufacturing and increased surface area.

The catalyst substrate is formed into a cell structure with a plurality of cells arranged in a honeycomb pattern using an extrusion technique, or the like. The extrusion technique is a mechanical operation that forms the substrate into the desired shape by extruding wet, soft substrate material from a die with patterned openings, with any combination of cell density and cell wall thickness imparted to the resulting cellular structure.

For example, conventional catalyst substrates can comprise about 400 cells per square inch, with cell walls having a thickness of about 8 to 10 mils, wherein one mil is equal to about 0.001 inches or about 0.025 millimeters. The thin walled, high cell density catalyst substrates can preferably comprise up to and exceeding about 1,200 cells per square inch, with cell walls having a thickness of about 2 mils to about 3.5 mils, with about 2.5 mils preferred, and about 2 mils especially preferred.

Disposed on and/or throughout the catalyst substrate can be a catalyst layer for converting exhaust gases to acceptable emissions levels as is known in the art. The catalyst may comprise one or more catalyst materials that are wash coated, imbibed, impregnated, physisorbed, chemisorbed, precipitated, or otherwise applied to the catalyst substrate. Possible catalyst materials include metals, such as platinum, palladium, rhodium, iridium, osmium, ruthenium, tantalum, zirconium, yttrium, cerium, nickel, copper, and the like, and oxides, mixtures and alloys comprising at least one of the foregoing, and other conventional catalysts.

In addition to disposing a catalyst on and/or throughout the catalyst substrate, a corrosive resistant, thermal durability material can also be disposed on part or all of the catalyst substrate using any one of, or a combination of the methods described above. The thermal durability material can be an organophosphate compound, wherein the cation is preferably a transition metal, rare earth metal, alkaline metal, and combinations comprising at least one of the foregoing, and the like, such as cerium, lanthanum, barium, aluminum, and zirconium, with zirconium phosphate preferred. Zirconium phosphate can bond with the zirconia that is already present in the cordierite mixture of the catalyst substrate material. Zirconium phosphate is preferably applied to cordierite, or a cordierite mixture of catalyst substrate material using a dipping process. The catalyst substrate can be dipped into a solution comprising zirconium metal and phosphoric acid, which reacts to form zirconium phosphate. The resulting layer of zirconium phosphate has a thickness of up to about 10 nanometers, with up to about 8 nanometers preferred, and up to about 4 nanometers especially preferred.

Zirconium phosphate possesses the following advantageous characteristics: (1) density of about 2.83 g/cc; (2) an open porosity percentage range of about 15 to about 20 percent; (3) a thermal conductivity value of about 6.2 BTU-in/hr-ft$^2$-° F.; (4) the ability to withstand a maximum service temperature value of about 2,800° F.; and (5) ultra high thermal shock resistance such that it can be heated or cooled at approximately 2,000° C. per minute without experiencing thermal shock. It is also resistant, under both basic and acidic conditions, to corrosive materials such as rare earth elements, alkaline earth elements, transition metal oxides, and precious metal salts, as well as compositions containing nitrogen oxides and sulfur oxides.

In contrast, cordierite possesses a lower density of about 2.44 g/cc, an open porosity percentage of about zero, and a thermal conductivity value of about 14 BTU-in/hr-ft$^2$-° F. Unlike zirconium phosphate, acidic conditions will etch a cordierite based catalyst substrate's surface, and weaken its structural integrity. In addition, a cordierite based catalyst substrate can only withstand a maximum service temperature of up to about 1,000.degree. C., and possess a low tolerance to thermal shock resistance.

Disposed concentrically around the catalyst substrate, to form a catalyst substrate/mat support material subassembly, is a mat support material that insulates the shell from both the high exhaust gas temperatures and the exothermic catalytic reaction occurring within the catalyst substrate. The mat support material, which enhances the structural integrity of the catalyst substrate by applying compressive radial forces about it, reducing its axial movement, and retaining it in place, is concentrically disposed around the catalyst substrate to form a mat support material/catalyst substrate subassembly. The mat support material can either be an intumescent material, e.g., one which contains ceramic materials, and other conventional materials such as an organic binder and the like, or combinations comprising at least one of the foregoing, and a vermiculite component that expands with heating to maintain firm uniform compression when the shell expands outward from the catalyst substrate, or a non-intumescent material, which does not contain vermiculite, as well as materials which include a combination of both. Typical non-intumescent materials include materials sold under the trademarks "NEXTEL" and "SAFFIL" by the "3M" Company, Minneapolis, Minn., or those sold under the trademark, "FEBERFRAX" and "CC-MAX" by the Unifrax Co., Niagara Falls, N.Y., and the like. Intumescent materials include materials sold under the trademark "INTERAM" by the "3M" Company, Minneapolis, Minn., as well as those intumescents which are also sold under the aforementioned "FIBERFRAX" trademark, as well as combinations thereof and others.

The mat support material/catalyst substrate subassembly can be concentrically disposed within a catalytic converter shell according to the method described herein, or in other configurations. The choice of material for the shell depends upon the type of exhaust gas, the maximum temperature of the catalyst substrate, the maximum temperature of the exhaust gas stream, and the like. Suitable materials for the shell can comprise any material that is capable of resisting under-car salt, temperature and corrosion. Typically, ferrous material is employed such as ferritic stainless steels. Ferritic stainless steels can include stainless steels such as the 400-Series such as SS-409, SS-439, and SS-441, with grade SS-409 generally preferred. An endcone, an endplate or an exhaust manifold assembly can be secured to the shell containing the mat support material/catalyst substrate subassembly to complete assembly of the catalytic converter, on either or both ends of the assembly.

Figure 1:
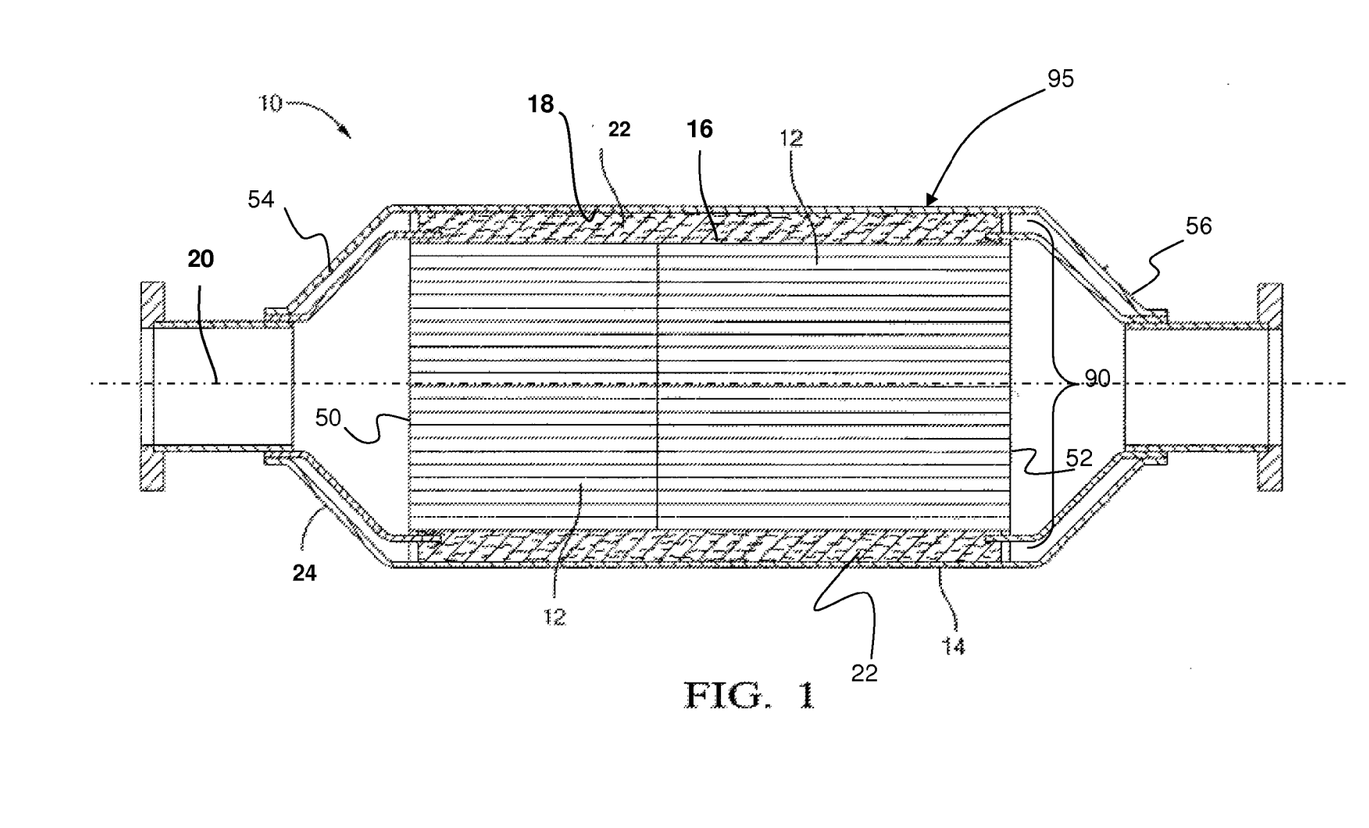
FIG. 1 is a cross-sectional view of a catalytic converter as described herein.

Referring now to FIG. 1, a catalytic converter 10 comprising at least one catalyst substrate 12 comprising a catalyst is disposed within metal shell 14. The catalyst substrate 12 and metal shell 14 may be made from the materials described herein. The catalyst substrate 12 and metal shell may have any suitable shape and size. It is preferred that the shapes be the same, such that catalyst substrate may be disposed with an outer surface 16 of the catalyst substrate 12 located within and equally spaced from an inner surface 18 of the metal shell 14 around the entire periphery or both components. The inner surface 18 of metal shell 14 defines a bore that extends along a longitudinal axis 20 of metal shell 14. For example, both catalyst substrate 12 and metal shell 14 may have the shape of a right cylinder with the catalyst substrate 12 concentrically disposed within metal shell 14, as shown in FIG. 1. A compressible mat support material 22 is concentrically disposed in compression between the shell 14 and catalyst substrate 12 around the periphery of catalyst substrate 12. The shell 14 includes at least one end, and generally has two ends, and an opening for the passage of exhaust gas therethrough. The ends are secured to at least one endcone, endplate (not shown), or an exhaust manifold cover (not shown), and further connected to an exhaust system component (not shown) such as an exhaust manifold assembly, connecting pipe, exhaust pipe, coupling assembly, flexible coupling assembly, mounting flange, or other exhaust system component, and combinations comprising at least one of the foregoing. As exhaust gas enters the exhaust system, the exhaust gas stream passes through the catalytic converter. The catalyst substrate catalytically treats the exhaust gas stream to remove environmentally undesirable exhaust gas elements.

The compressible mat support material 22 is disposed in compression between the inner surface 18 of the metal shell 14 in the outer surface 16 of the catalyst substrate 12. The nature of the mat support material and the amount by which it is compressed determine the gap bulk density, or the density of the mat support 22 when it is disposed in the gap according to the method described herein. The mat support 22 has a first friction coefficient of sliding friction relative to the metal shell 14. It also has a second friction coefficient of sliding friction relative to the catalyst substrate 12. In its compressed state as shown in FIG. 1, the mat support 22 provides a spring force acting to retain the catalyst substrate 12 within the bore 18. The peripheral size is configured or sized according to the method described herein as a function of the spring force, first friction coefficient and second friction coefficient by reduction of the periphery to provide a predetermined axial retention force according to the method described herein. Once the predetermined axial retention force is achieved, the reduction of the periphery is completed.

Figure 3:
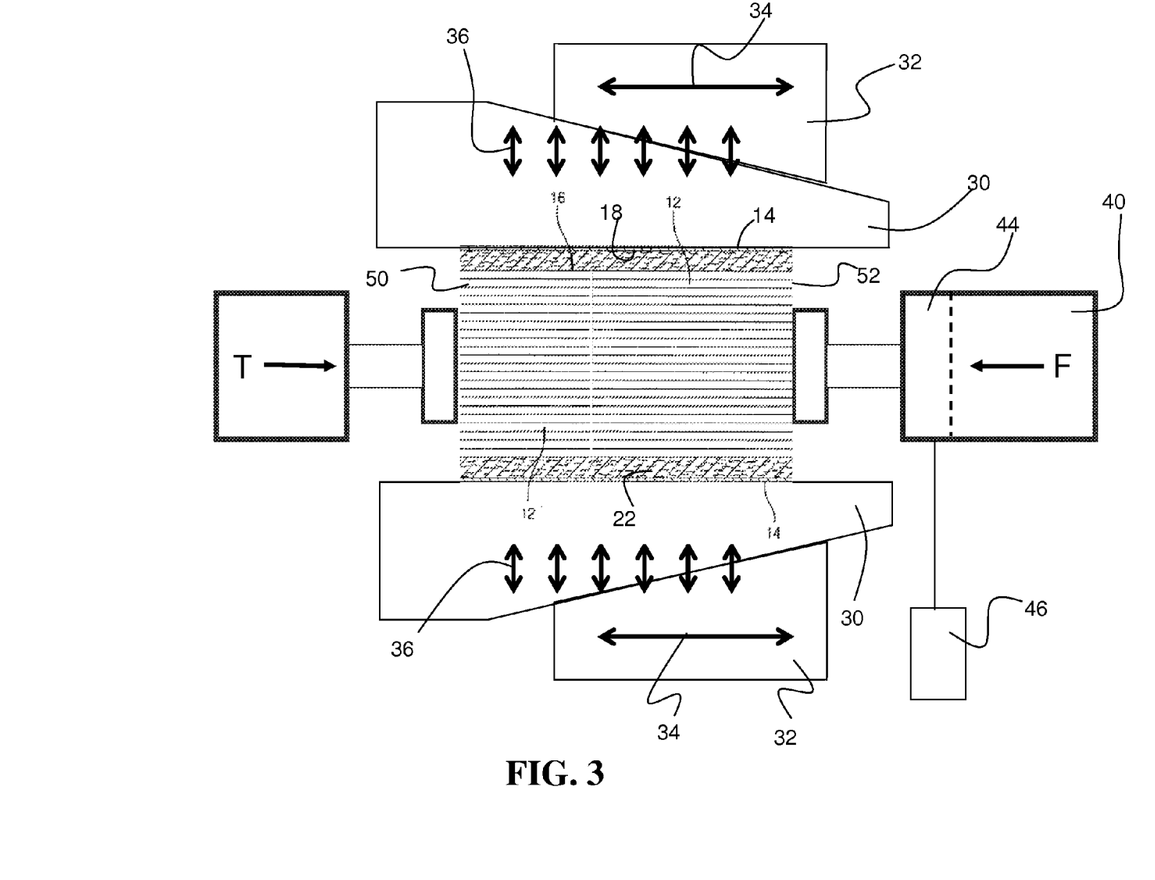
FIG. 3 is a partial cross-sectional illustration of a second embodiment of a method of making a catalytic converter as described herein.
Figure 4:
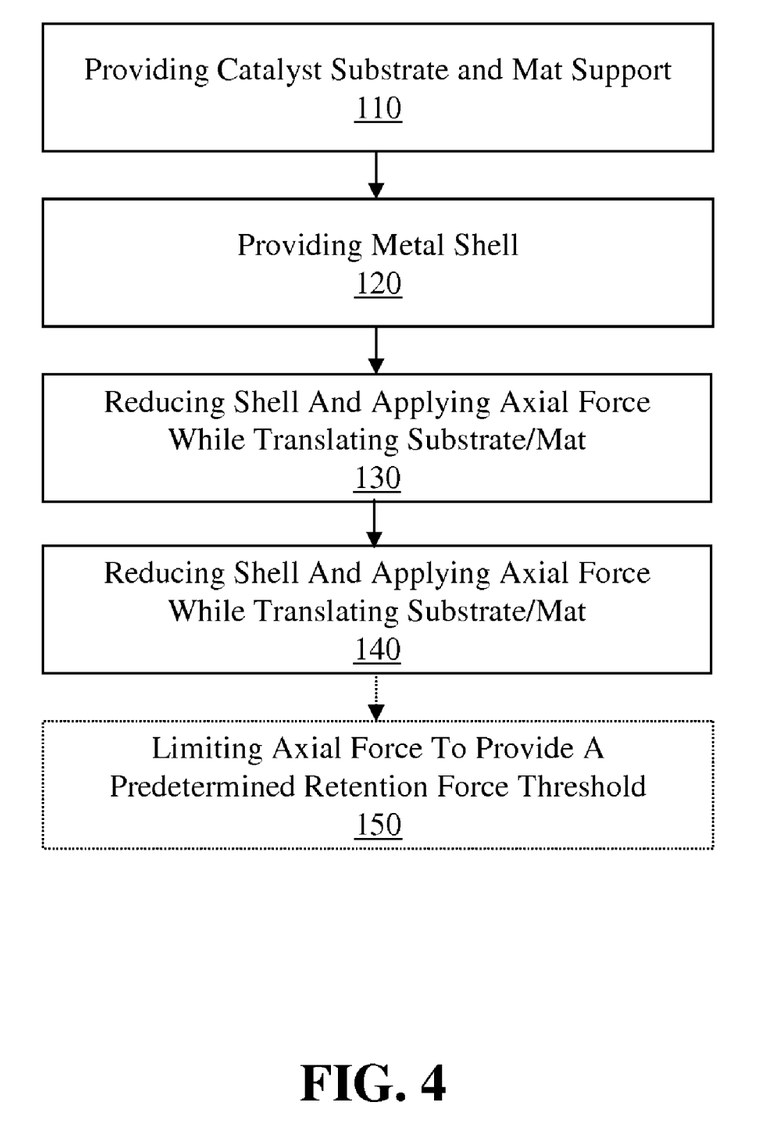
FIG. 4 is a flow diagram of a method of making a catalytic converter as described herein.

The catalytic converter 10 described herein may be manufactured by a method 100 of making a catalytic converter, comprising: providing 110 a catalyst substrate 12 having a substrate periphery and a mat support 22 disposed thereon; providing 120 a metal shell 14 having a shell wall having a shell periphery and a bore 26 that is configured to receive the catalyst substrate 12 and mat support 22; inserting 130 the catalyst substrate 12 and mat 22 support into the bore 26 of the metal shell 14 in slidable engagement therewith; reducing 140 the shell periphery while applying an axial force (Arrow F in FIGS. 2 and 3) sufficient to cause translation of the catalyst substrate 12 and mat support 22 relative to the bore 26; and limiting 150 the axial force applied during translation of the catalyst substrate 12 and mat support 22 to a predetermined retention force threshold, whereupon the reducing of the shell periphery and translation of the catalyst substrate 22 is stopped.

Providing 110 a catalyst substrate 12 having a substrate periphery and a mat support 22 disposed thereon may be performed by making catalyst substrate 12 and a mat support 22 of the types described herein. As noted herein, catalyst substrate 12 may have any suitable shape, such as a right cylinder. In this configuration, the shape of the periphery (i.e., the shape of the exterior surface of an orthogonal section of the metal shell along the longitudinal axis) has the shape of a circle. Any suitable shape of the catalyst substrate 12 and its periphery may be used, such as various circular, elliptical and other shapes. The mat support 22 may be made of the materials described herein and disposed on the periphery as a sheet or blanket which is wrapped around the outer surface of mat support 22 forming a catalyst substrate/mat support subassembly 90.

Providing 120 a metal shell 14 having a shell wall having a shell periphery and a bore 26 that is configured to receive the catalyst substrate 12 and mat support 22 may performed by making a metal shell 14 of the types described herein. As noted herein, metal shell 14 may have any suitable shape, such as a right cylinder. Any suitable shape of the metal shell 14 and its periphery may be used, such as various circular, elliptical and other shapes. In an exemplary embodiment, the metal shell 14 has the same shape as the catalyst substrate 12, such as a right circular cylinder. The metal shell 14 is configured to receive the catalyst substrate/mat support subassembly 90 by having a bore (e.g., a cylindrical bore), that is larger than (e.g., a larger bore diameter) than the catalyst substrate/mat support subassembly. The size difference should be large enough that the catalyst substrate/mat support subassembly may be inserted into the bore without an interference, or in another exemplary embodiment with a slight interference, or in yet another exemplary embodiment with an interference that is small enough to permit the subassembly to be inserted with an axial force that is less than the predetermined force, in yet another embodiment with an interference that requires an axial force that is substantially less than the predetermined force.

Inserting 130 the catalyst substrate 12 and mat support 22 into the bore 26 of the metal shell 14 in slidable engagement therewith may performed by making a metal shell 14 of the types described herein and with the relative sizes described herein. Inserting may be done by placing the catalyst substrate/mat support subassembly 90 in the bore in the case where no interference between them exists. If an interference exists, then an axial force sufficient to insert the subassembly 90 will be applied. Slidable engagement means that when the catalyst substrate/mat support subassembly 90 is inserted in the metal shell 14 it is configured to slide within the bore in response to application of an axial force, such as by application of an axial force to an end of the catalyst substrate 12.

Figure 2:
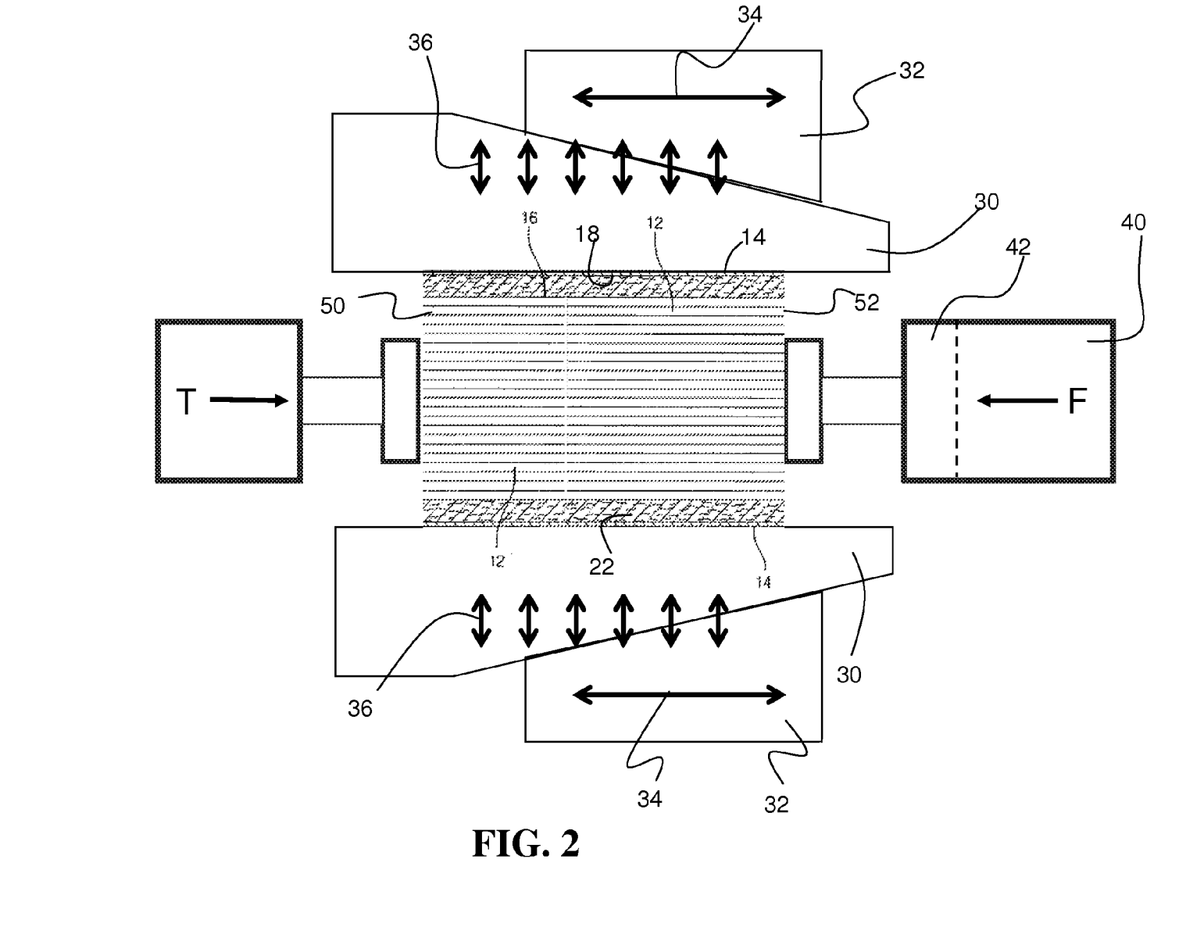
FIG. 2 is a partial cross-sectional illustration of a method of making a catalytic converter as described herein.

Reducing 140 the shell periphery while applying an axial force sufficient to cause translation of the catalyst substrate 12 and mat support 22 relative to the bore 26 may be performed by any suitable method of reducing the size of the metal shell. In an exemplary embodiment, the metal shell 14 containing the may be reduced by swaging the metal shell 14 and subassembly 90 using a swaging die as shown in FIG. 2. The metal shell 14 containing the catalyst substrate/mat support substrate subassembly is placed in a reducing collar 30. The reducing collar 30 is moved relative to the swaging die 32 in the direction shown by arrows 34. As the reducing collar 30 moves through the swaging die 32, the periphery, or in the example of the cylindrical shapes, the outer diameter, is reduced as force is applied to the periphery of metal shell 14 as shown schematically in FIG. 2 by arrows 36. While the metal shell 14 is swaged, and the diameter is reduced, an axial force is applied causing catalyst substrate/mat support subassembly 90 to be translated within the bore. As the diameter is reduced, the mat support 22 is progressively compressed against the inner surface 18 of metal shell 14. As mat support 22 is further compressed by swaging, the sliding friction of the mat support 22 against the inner surface 18 increases and the force required to translate the catalyst substrate/mat support subassembly 90 also increases. When the axial force reaches a predetermined force, the swaging of metal shell 14 and translation of catalyst substrate/mat support subassembly 90 may be stopped. The predetermined retention force at which the swaging of the metal shell 14 and translation of the catalyst substrate/mat support subassembly 90 is stopped may be any suitable force, but will preferably be selected to correspond to a compressive retention force sufficient to retain catalyst substrate/mat support subassembly 90 securely within metal shell 14 for use as a catalytic converter in a motor vehicle, such as an automobile. The predetermined retention force may vary based on the shape and size of the catalyst substrate/mat support subassembly 90, metal shell 14, vehicular requirements and other factors. Using method 100, the predetermined retention force can be controlled to achieve repeatable results when manufacturing a plurality of catalyst substrate/mat support/metal shell assemblies 95. For a given combination of catalyst substrate 12, mat support 22 and metal shell 14, method 100 can accommodate size and material variations in the starting components, such as occur due to lot-to-lot variations which typically occur in these components, by controlling the swaging of the metal shell 14 to achieve the same predetermined retention force. While the same predetermined retention force may be achieved for a given design and combination of materials, such as a cylindrical design, the amount of swaging required for each assembly 95 will generally result in variation of the diameter, or other outer size dimension for non-cylindrical components, of the metal shell 14. Thus, variability of the retention force of the catalyst substrate 12 will be greatly reduced or eliminated, having manufactured the assembly to a predetermined retention force, while variability of the outer dimension (e.g., diameter) of the metal shell 14 in such assemblies will be expected. For a given design (i.e., part number), the amount of variability of the outer dimension may generally be characterized by development of a range of tolerances of this dimension, and may be compensated for in various ways, such as by designing the mounting features to accommodate such variability.

Applying a force sufficient to cause translation of the catalyst substrate 12 and mat support 22 relative to the bore 26 may be performed by any suitable method of applying the axial force to these components. In an exemplary embodiment, applying the axial force may include using a motorized ball screw 40 to translate the catalyst substrate 12 and mat support 22, as shown in FIGS. 2 and 3. While the axial force may generally be applied to both components, it is believed that the force may be applied to just the catalyst substrate 12 in embodiments where the friction coefficient of the mat support 22 with regard to the catalyst substrate 12 is greater than that of the mat support 22 with regard to the metal shell 14, such that the tendency of the system is to slide at the mat support 22 interface with the metal shell 14 preferentially to mat support 22 interface with the catalyst substrate 12.

Limiting 150 the axial force applied during translation of the catalyst substrate 12 and mat support 22 to a predetermined retention force threshold, whereupon the reducing of the shell periphery and translation of the catalyst substrate 22 is stopped may be performed by any suitable method of limiting the axial force during translation. The motorized ball screw may include an axial force limiting mechanism to limit the axial force applied a predetermined retention force threshold. In an exemplary embodiment of FIG. 2, the axial force limiting mechanism may include an integral force limiting mechanism, such as a clutch 42, associated with the motorized drive of the ball screw to limit the maximum axial force that may be applied by the ball screw. The maximum axial force will be limited to provide the desired predetermined retention force threshold.

In another exemplary embodiment of FIG. 3, the axial force limiting mechanism may alternately include, a separate axial force limiting mechanism, such as force transducer 44 that is in signal communication with a controller 46. The controller may be configured to determine the axial force applied to the catalyst substrate and, through signal communication with an electric motor of the ball screw, stop the reducing and translation upon reaching the predetermined retention force threshold.

The method 100 of making a catalytic converter may also include applying the axial force one end of the catalyst substrate while simultaneously applying a tare force in an opposite direction at another end of the catalyst substrate. The application of a tare force (arrow T in FIGS. 2 and 3) may be useful to improve the determination of the threshold retention force by operating the system in a range of force that is particularly suited to the means used to measure and/or limit the application of the axial force.

The method 100 of making a catalytic converter described herein wherein the metal wall 14 has a first end 50 and a second end 52 (FIGS. 2 and 3) may also include attaching a first end cap 54 to the first end 50 and a second end cap 56 to the second end 52. The end caps 54,56 partially enclose the metal wall 14 and catalyst substrate 12.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

I claim:

1. A method a making a catalytic converter, comprising:
providing a catalyst substrate having a substrate periphery and a mat support disposed thereon;
providing a metal shell having a shell wall having a shell periphery and a bore that is configured to receive the catalyst substrate and mat support;
inserting the catalyst substrate and mat support into the bore of the metal shell in slidable engagement therewith;
reducing the shell periphery while applying an axial force sufficient to cause translation of the catalyst substrate and mat support relative to the bore; and
limiting the axial force applied during translation of the catalyst substrate and mat support to a predetermined retention force threshold, whereupon the reducing of the shell periphery and translation of the catalyst substrate is stopped.

2. The method of making a catalytic converter of claim 1, wherein reducing the shell periphery is performed by swaging the metal shell.

3. The method of making a catalytic converter of claim 1, wherein applying the axial force comprises using a motorized ball screw to translate the catalyst substrate.

4. The method of making a catalytic converter of claim 3, wherein the motorized ball screw has an integral axial force limiting mechanism.

5. The method of making a catalytic converter of claim 4, wherein the integral axial force limiting mechanism comprises a clutch.

6. The method of making a catalytic converter of claim 3, wherein the motorized ball screw further comprises a force transducer that is in signal communication with a controller, and wherein the controller is configured to determine the axial force applied to the catalyst substrate and stop the reducing and translation upon reaching the predetermined retention force threshold.

7. The method of making a catalytic converter of claim 1, wherein the force is applied to one end of the catalyst substrate and further comprising applying a tare force at another end of the catalyst substrate.

8. The method of making a catalytic converter of claim 1, wherein the metal shell comprises a stainless steel.

9. The method of making a catalytic converter of claim 1, wherein the catalyst substrate comprises alumina, cordierite or silicon carbide.

10. The method of making a catalytic converter of claim 1, wherein the metal wall has a first end and a second end, further comprising attaching a first end cap to the first end and a second end cap to the second end, wherein the end caps partially enclose the metal wall and catalyst substrate.

11. A method of making a catalytic converter, comprising:
providing a catalyst substrate having a substrate periphery and a mat support disposed thereon;
providing a metal shell having a shell wall having a shell periphery and a bore that is configured to receive the catalyst substrate and mat support;

inserting the catalyst substrate and mat support into the bore of the metal shell in slidable engagement therewith;

reducing the shell periphery while applying an axial force sufficient to cause translation of the catalyst substrate and mat support relative to the bore until the force reaches a predetermined retention force threshold, wherein the reducing of the shell periphery and translation of the catalyst substrate is stopped.

12. The method of making a catalytic converter of claim 11, wherein reducing the shell periphery is performed by swaging the metal shell.

13. The method of making a catalytic converter of claim 11, wherein applying the axial force comprises using a motorized ball screw to translate the catalyst substrate.

14. The method of making a catalytic converter of claim 13, wherein the motorized ball screw has an integral axial force limiting mechanism.

15. The method of making a catalytic converter of claim 14, wherein the integral axial force limiting mechanism comprises a clutch.

16. The method of making a catalytic converter of claim 13, wherein the motorized ball screw further comprises a force transducer that is in signal communication with a controller, and wherein the controller is configured to determine the axial force applied to the catalyst substrate and stop the reducing and translation upon reaching the predetermined retention force threshold.

17. The method of making a catalytic converter of claim 11, wherein the axial force is applied to one end of the catalyst substrate and further comprising applying a tare force at another end of the catalyst substrate.

18. The method of making a catalytic converter of claim 11, wherein the metal shell comprises a stainless steel.

19. The method of making a catalytic converter of claim 11, wherein the catalyst substrate comprises alumina, cordierite or silicon carbide.

20. The method of making a catalytic converter of claim 11, wherein the metal wall has a first end and a second end, further comprising attaching a first end cap to the first end and a second end cap to the second end, wherein the end caps partially enclose the metal wall and catalyst substrate.

* * * * *